(12) United States Patent
Brunk et al.

(10) Patent No.: US 8,051,295 B2
(45) Date of Patent: *Nov. 1, 2011

(54) BENCHMARKS FOR DIGITAL WATERMARKING

(75) Inventors: Hugh L. Brunk, Portland, OR (US); Brett Alan Bradley, Portland, OR (US); Brett T. Hannigan, Philadelphia, PA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/582,398

(22) Filed: Oct. 20, 2009

(65) Prior Publication Data

US 2010/0042843 A1 Feb. 18, 2010

Related U.S. Application Data

(63) Continuation of application No. 10/045,654, filed on Oct. 26, 2001, now Pat. No. 7,607,016, which is a continuation-in-part of application No. 09/951,143, filed on Sep. 10, 2001, now Pat. No. 7,277,468, which is a continuation-in-part of application No. 09/938,870, filed on Aug. 23, 2001, now Pat. No. 7,246,239, which is a continuation-in-part of application No. 09/840,016, filed on Apr. 20, 2001, now Pat. No. 6,760,464.

(51) Int. Cl.
*H04L 9/32* (2006.01)
*G06F 7/04* (2006.01)
(52) U.S. Cl. .......... 713/176; 713/168; 726/26; 382/276; 382/277; 382/278; 705/75
(58) Field of Classification Search ........................ None
See application file for complete search history.

(56) References Cited

U.S. PATENT DOCUMENTS

| 5,559,933 | A | 9/1996 | Boswell |
| 5,613,004 | A | 3/1997 | Cooperman et al. |
| 5,617,119 | A | 4/1997 | Briggs et al. |
| 5,636,292 | A | 6/1997 | Rhoads |
| 5,646,997 | A | 7/1997 | Barton |
| 5,721,788 | A | 2/1998 | Powell et al. |
| 5,727,092 | A | 3/1998 | Sandford, II et al. |
| 5,745,604 | A | 4/1998 | Rhoads |
| 5,748,763 | A | 5/1998 | Rhoads |
| 5,768,426 | A | 6/1998 | Rhoads |

(Continued)

FOREIGN PATENT DOCUMENTS

WO WO9827510 6/1998

(Continued)

OTHER PUBLICATIONS

Bender et al., "Techniques for Data Hiding," Proc. SPIE, vol. 2420, Feb. 9, 1995, pp. 164-173.

(Continued)

*Primary Examiner* — Kambiz Zand
*Assistant Examiner* — William Powers

(57) ABSTRACT

The presently claimed invention relates generally to digital watermarking of data, e.g., representing video or audio. One claim recites a method including: obtaining data representing video or audio; using a multi-purpose electronic processor programmed for: transforming the data into a transform domain, analyzing the transformed data to identify a plurality of transform coefficients according to predetermined criteria, and altering the identified plurality of transform coefficients to carry a digital watermark; and analyzing the data to determine a baseline state for the digital watermark. Of course, other combinations and claims are provided too.

42 Claims, 3 Drawing Sheets

U.S. PATENT DOCUMENTS

| | | | |
|---|---|---|---|
| 5,778,102 A * | 7/1998 | Sandford et al. | 382/251 |
| 5,790,703 A | 8/1998 | Wang | |
| 5,799,092 A | 8/1998 | Kristol et al. | |
| 5,825,892 A | 10/1998 | Braudaway et al. | |
| 5,841,886 A | 11/1998 | Rhoads | |
| 5,850,481 A | 12/1998 | Rhoads | |
| 5,859,920 A | 1/1999 | Daly et al. | |
| 5,862,260 A | 1/1999 | Rhoads | |
| 5,930,369 A * | 7/1999 | Cox et al. | 380/54 |
| 5,933,798 A | 8/1999 | Linnartz | |
| 5,949,055 A | 9/1999 | Fleet et al. | |
| 5,974,548 A | 10/1999 | Adams | |
| 6,026,193 A | 2/2000 | Rhoads | |
| 6,064,764 A * | 5/2000 | Bhaskaran et al. | 382/183 |
| 6,122,392 A | 9/2000 | Rhoads | |
| 6,226,387 B1 | 5/2001 | Tewfik et al. | |
| 6,239,818 B1 | 5/2001 | Yoda | |
| 6,240,121 B1 | 5/2001 | Senoh | |
| 6,246,777 B1 | 6/2001 | Agarwal et al. | |
| 6,266,430 B1 | 7/2001 | Rhoads | |
| 6,275,599 B1 | 8/2001 | Adler et al. | |
| 6,285,775 B1 | 9/2001 | Wu et al. | |
| 6,285,776 B1 | 9/2001 | Rhoads | |
| 6,289,108 B1 | 9/2001 | Rhoads | |
| 6,330,335 B1 | 12/2001 | Rhoads | |
| 6,330,672 B1 * | 12/2001 | Shur | 713/176 |
| 6,332,031 B1 | 12/2001 | Rhoads et al. | |
| 6,343,138 B1 | 1/2002 | Rhoads | |
| 6,353,672 B1 | 3/2002 | Rhoads | |
| 6,359,985 B1 | 3/2002 | Koch et al. | |
| 6,359,998 B1 | 3/2002 | Cooklev | |
| 6,363,159 B1 | 3/2002 | Rhoads | |
| 6,366,685 B1 * | 4/2002 | Takaragi | 382/140 |
| 6,389,151 B1 | 5/2002 | Carr et al. | |
| 6,400,827 B1 | 6/2002 | Rhoads | |
| 6,404,898 B1 | 6/2002 | Rhoads | |
| 6,424,725 B1 | 7/2002 | Rhoads et al. | |
| 6,430,302 B2 | 8/2002 | Rhoads | |
| 6,449,379 B1 | 9/2002 | Rhoads | |
| 6,449,380 B1 | 9/2002 | Acharya et al. | |
| 6,456,726 B1 | 9/2002 | Yu et al. | |
| 6,463,162 B1 | 10/2002 | Vora | |
| 6,487,301 B1 | 11/2002 | Zhao | |
| 6,496,591 B1 | 12/2002 | Rhoads | |
| 6,512,837 B1 | 1/2003 | Ahmed | |
| 6,516,079 B1 | 2/2003 | Rhoads et al. | |
| 6,519,352 B2 | 2/2003 | Rhoads | |
| 6,522,771 B2 | 2/2003 | Rhoads | |
| 6,535,618 B1 | 3/2003 | Rhoads | |
| 6,539,095 B1 | 3/2003 | Rhoads | |
| 6,542,618 B1 | 4/2003 | Rhoads | |
| 6,542,620 B1 | 4/2003 | Rhoads | |
| 6,560,349 B1 | 5/2003 | Rhoads | |
| 6,563,935 B1 | 5/2003 | Echizen et al. | |
| 6,567,534 B1 | 5/2003 | Rhoads | |
| 6,567,535 B2 | 5/2003 | Rhoads | |
| 6,567,780 B2 | 5/2003 | Rhoads | |
| 6,574,350 B1 | 6/2003 | Rhoads et al. | |
| 6,577,744 B1 | 6/2003 | Braudaway et al. | |
| 6,580,819 B1 | 6/2003 | Rhoads | |
| 6,587,821 B1 | 7/2003 | Rhoads | |
| 6,590,997 B2 | 7/2003 | Rhoads | |
| 6,614,914 B1 | 9/2003 | Rhoads et al. | |
| 6,636,615 B1 | 10/2003 | Rhoads et al. | |
| 6,647,129 B2 | 11/2003 | Rhoads | |
| 6,654,480 B2 | 11/2003 | Rhoads | |
| 6,654,887 B2 | 11/2003 | Rhoads | |
| 6,675,146 B2 | 1/2004 | Rhoads | |
| 6,683,966 B1 | 1/2004 | Tian et al. | |
| 6,694,041 B1 | 2/2004 | Brunk | |
| 6,704,431 B1 | 3/2004 | Ogawa et al. | |
| 6,714,683 B1 | 3/2004 | Tian et al. | |
| 6,724,912 B1 | 4/2004 | Carr et al. | |
| 6,738,495 B2 | 5/2004 | Rhoads et al. | |
| 6,744,907 B2 | 6/2004 | Rhoads | |
| 6,750,985 B2 | 6/2004 | Rhoads | |
| 6,754,377 B2 | 6/2004 | Rhoads | |
| 6,757,406 B2 | 6/2004 | Rhoads | |
| 6,760,464 B2 | 7/2004 | Brunk | |
| 6,768,808 B2 | 7/2004 | Rhoads | |
| 6,768,809 B2 | 7/2004 | Rhoads et al. | |
| 6,771,796 B2 | 8/2004 | Rhoads | |
| 6,771,797 B2 | 8/2004 | Ahmed | |
| 6,778,682 B2 | 8/2004 | Rhoads | |
| 6,788,800 B1 | 9/2004 | Carr et al. | |
| 6,804,376 B2 | 10/2004 | Rhoads et al. | |
| 6,804,377 B2 | 10/2004 | Reed | |
| 6,804,379 B2 | 10/2004 | Rhoads | |
| 6,856,977 B1 | 2/2005 | Adelsbach et al. | |
| 6,882,738 B2 | 4/2005 | Davis et al. | |
| 6,944,298 B1 | 9/2005 | Rhoads | |
| 6,959,100 B2 | 10/2005 | Rhoads | |
| 6,959,386 B2 | 10/2005 | Rhoads | |
| 6,961,444 B2 | 11/2005 | Levy | |
| 6,970,573 B2 | 11/2005 | Carr et al. | |
| 6,978,036 B2 | 12/2005 | Alattar et al. | |
| 6,983,051 B1 | 1/2006 | Rhoads | |
| 6,987,862 B2 | 1/2006 | Rhoads | |
| 6,993,152 B2 | 1/2006 | Patterson et al. | |
| 6,993,154 B2 | 1/2006 | Brunk | |
| 7,003,132 B2 | 2/2006 | Rhoads | |
| 7,013,021 B2 | 3/2006 | Sharma et al. | |
| 7,016,516 B2 | 3/2006 | Rhoads | |
| 7,020,303 B2 | 3/2006 | Levy | |
| 7,020,349 B2 | 3/2006 | Brunk | |
| 7,027,612 B2 | 4/2006 | Patterson | |
| 7,054,461 B2 | 5/2006 | Zeller et al. | |
| 7,054,462 B2 | 5/2006 | Rhoads et al. | |
| 7,054,463 B2 | 5/2006 | Rhoads et al. | |
| 7,076,084 B2 | 7/2006 | Davis et al. | |
| 7,111,170 B2 | 9/2006 | Hein | |
| 7,113,596 B2 | 9/2006 | Rhoads | |
| 7,113,615 B2 | 9/2006 | Rhoads et al. | |
| 7,116,781 B2 | 10/2006 | Rhoads | |
| 7,130,087 B2 | 10/2006 | Rhoads | |
| 7,142,691 B2 | 11/2006 | Levy | |
| 7,174,031 B2 | 2/2007 | Rhoads | |
| 7,181,022 B2 | 2/2007 | Rhoads | |
| 7,184,570 B2 | 2/2007 | Rhoads | |
| 7,197,156 B1 | 3/2007 | Levy | |
| 7,197,164 B2 | 3/2007 | Levy | |
| 7,231,061 B2 | 6/2007 | Bradley | |
| 7,239,734 B2 | 7/2007 | Alattar et al. | |
| 7,242,790 B2 | 7/2007 | Rhoads | |
| 7,246,239 B2 | 7/2007 | Rodriguez et al. | |
| 7,248,715 B2 | 7/2007 | Levy | |
| 7,263,203 B2 | 8/2007 | Rhoads et al. | |
| 7,266,217 B2 | 9/2007 | Rhoads et al. | |
| 7,269,275 B2 | 9/2007 | Carr et al. | |
| 7,277,468 B2 | 10/2007 | Tian et al. | |
| 7,286,684 B2 | 10/2007 | Rhoads et al. | |
| 7,305,117 B2 | 12/2007 | Davis et al. | |
| 7,313,253 B2 | 12/2007 | Davis et al. | |
| 7,321,667 B2 | 1/2008 | Stach | |
| 7,340,076 B2 | 3/2008 | Stach et al. | |
| 7,346,776 B2 | 3/2008 | Levy et al. | |
| 7,349,555 B2 | 3/2008 | Rhoads | |
| 7,352,878 B2 | 4/2008 | Reed et al. | |
| 7,359,528 B2 | 4/2008 | Rhoads | |
| 7,369,678 B2 | 5/2008 | Rhoads | |
| 7,372,976 B2 | 5/2008 | Rhoads et al. | |
| 7,406,214 B2 | 7/2008 | Rhoads et al. | |
| 7,415,129 B2 | 8/2008 | Rhoads | |
| 7,418,111 B2 | 8/2008 | Rhoads | |
| 7,424,132 B2 | 9/2008 | Rhoads | |
| 7,499,564 B2 | 3/2009 | Rhoads | |
| 7,532,741 B2 | 5/2009 | Stach | |
| 7,536,034 B2 | 5/2009 | Rhoads | |
| 7,536,555 B2 | 5/2009 | Rhoads | |
| 7,539,325 B2 | 5/2009 | Rhoads et al. | |
| 7,548,643 B2 | 6/2009 | Davis et al. | |
| 7,555,139 B2 | 6/2009 | Rhoads et al. | |
| 7,567,686 B2 | 7/2009 | Rhoads | |
| 7,570,784 B2 | 8/2009 | Alattar | |
| 7,602,940 B2 | 10/2009 | Rhoads et al. | |
| 7,602,977 B2 | 10/2009 | Rhoads et al. | |
| 7,606,390 B2 | 10/2009 | Rhoads | |

| | | |
|---|---|---|
| 7,607,016 B2 | 10/2009 | Brunk et al. |
| 7,620,200 B2 | 11/2009 | Rhoads |
| 7,639,837 B2 | 12/2009 | Carr et al. |
| 7,643,649 B2 | 1/2010 | Davis |
| 7,656,930 B2 | 2/2010 | Tian et al. |
| 7,672,477 B2 | 3/2010 | Rhoads |
| 7,676,059 B2 | 3/2010 | Rhoads |
| 7,693,965 B2 | 4/2010 | Rhoads |
| 7,697,719 B2 | 4/2010 | Rhoads |
| 7,702,511 B2 | 4/2010 | Rhoads |
| 7,711,143 B2 | 5/2010 | Rhoads |
| 7,720,249 B2 | 5/2010 | Rhoads |
| 7,720,255 B2 | 5/2010 | Rhoads |
| 7,724,919 B2 | 5/2010 | Rhoads |
| 7,756,290 B2 | 7/2010 | Rhoads |
| 7,763,179 B2 | 7/2010 | Levy |
| 7,792,325 B2 | 9/2010 | Rhoads |
| 7,796,826 B2 | 9/2010 | Rhoads et al. |
| 7,831,062 B2 | 11/2010 | Stach |
| 2001/0020270 A1 | 9/2001 | Yeung et al. |
| 2001/0022848 A1 | 9/2001 | Rhoads |
| 2001/0030759 A1 | 10/2001 | Hayashi et al. |
| 2002/0026362 A1 | 2/2002 | Tanaka |
| 2002/0031240 A1 | 3/2002 | Levy et al. |
| 2002/0076084 A1 | 6/2002 | Tian et al. |
| 2002/0080995 A1 | 6/2002 | Rhoads |
| 2002/0099943 A1 | 7/2002 | Rodriguez et al. |
| 2002/0136429 A1 | 9/2002 | Stach et al. |
| 2002/0172398 A1 | 11/2002 | Hayashi |
| 2002/0176114 A1 | 11/2002 | Zeller et al. |
| 2002/0178368 A1 | 11/2002 | Yin et al. |
| 2002/0191811 A1 | 12/2002 | Kamijo |
| 2003/0021440 A1 | 1/2003 | Rhoads |
| 2003/0097568 A1 | 5/2003 | Choi et al. |
| 2003/0138128 A1 | 7/2003 | Rhoads |
| 2004/0057581 A1 | 3/2004 | Rhoads |
| 2004/0181671 A1 | 9/2004 | Brundage et al. |
| 2004/0202348 A1 | 10/2004 | Kuzma |
| 2004/0263911 A1 | 12/2004 | Rodriguez |
| 2006/0028689 A1 | 2/2006 | Perry et al. |
| 2006/0062386 A1 | 3/2006 | Rhoads |
| 2007/0016790 A1 | 1/2007 | Brundage et al. |
| 2007/0172098 A1 | 7/2007 | Rhoads |
| 2007/0180251 A1 | 8/2007 | Carr |
| 2007/0201835 A1 | 8/2007 | Rhoads |
| 2008/0016360 A1 | 1/2008 | Rodriguez et al. |
| 2008/0131083 A1 | 6/2008 | Rhoads |
| 2008/0131084 A1 | 6/2008 | Rhoads |
| 2008/0149713 A1 | 6/2008 | Brundage |
| 2008/0253740 A1 | 10/2008 | Rhoads |
| 2008/0270801 A1 | 10/2008 | Levy et al. |
| 2008/0275906 A1 | 11/2008 | Rhoads et al. |
| 2009/0252401 A1 | 10/2009 | Davis et al. |
| 2010/0008534 A1 | 1/2010 | Rhoads |
| 2010/0008536 A1 | 1/2010 | Rhoads |
| 2010/0008537 A1 | 1/2010 | Rhoads |
| 2010/0021004 A1 | 1/2010 | Rhoads |
| 2010/0027969 A1 | 2/2010 | Alattar |
| 2010/0040255 A1 | 2/2010 | Rhoads |
| 2010/0119108 A1 | 5/2010 | Rhoads |
| 2010/0131767 A1 | 5/2010 | Rhoads |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172538 A1 | 7/2010 | Rhoads |

FOREIGN PATENT DOCUMENTS

| | | |
|---|---|---|
| WO | WO0209019 | 1/2002 |
| WO | WO0219489 | 3/2002 |
| WO | WO0223468 | 3/2002 |
| WO | WO0250773 | 6/2002 |
| WO | WO02056264 | 7/2002 |
| WO | WO02089057 | 11/2002 |

OTHER PUBLICATIONS

Hartung et al., "Digital Watermarking of Raw and Compressed Video," Proc. SPIE 2952, Digital Compression Technologies and Systems for Video Communications, Oct. 1996, 9 pages.

Hartung, et al., "Watermarking of uncompressed and compressed video," Signal Processing, vol. 66, No. 3, pp. 283-301, May 1998.

Koch et al., "Copyright Protection for Multimedia Data," Proc. Of the Int. Conf. On Digital Media and Electronic Publishing, Leeds, U.K., Dec. 1994, 15 pages.

Ó Ruanaidh, "Rotation, Scale and Translation Invariant Digital Image Watermarking," Proceedings of the International Conference of Image Processing, vol. I, Signal Processing, pp. 536-539, 1997.

Ó Ruanaidh, "Rotation, Scale and Translation Invariant (Spread Spectrum) Digital Image Watermarking," Signal Processing 66, pp. 303-317, 1998.

Schneider et al., A Robust Content Based Digital Sig Proc. Int. Conf. on Image Processing, Sep. 16-19, 1996, Part vol. 3, pp. 227-230.

Sheng, "Experiments on Pattern Recognition Using Invariant Fourier-Mellin Descriptors," Journal of Optical Society of America, vol. 3, No. 6, pp. 771-776, 1986.

Tian, "Wavelet-Based Image Compression and Content Authentication," SPIE, vol. 4551, Oct. 22, 2001, 10 pages.

Yeung et al., "Digital Watermarking: Shedding Light on the Invisible," IEEE Computer, Nov. 1, 1998, pp. 32-41.

van Schyndel et al., "Towards a Robust Digital Watermark," ACCV '95, vol. 2, Dec. 1995, pp. 504-508.

Wu et al., Data Hiding in Digital Binary Image, Proc. Int'l Conf. On Multimedia and Expo, Jul. 31, 2000, pp. 393-396.

U.S. Appl. No. 60/198,138, filed Apr. 17, 2000.

U.S. Appl. No. 60/232,163, filed Sep. 11, 2000.

U.S. Appl. No. 08/154,866, filed Nov. 18, 1993, Geoffrey B. Rhoads.

U.S. Appl. No. 08/215,289, filed Mar. 17, 1994, Geoffrey B. Rhoads.

U.S. Appl. No. 09/150,147, filed Sep. 9, 1998, Geoffrey B. Rhoads.

U.S. Appl. No. 09/151,492, filed Sep. 11, 1998, Bruce L. Davis et al.

U.S. Appl. No. 09/496,380, filed Feb. 2, 2000, Geoffrey B. Rhods.

U.S. Appl. No. 12/881,911, filed Sep. 14, 2010, Geoffrey B. Rhoads et al.

U.S. Appl. No. 12/692,470, filed Jan. 22, 2010, Jun Tian et al.

* cited by examiner

BENCHMARKS FOR DIGITAL WATERMARKING

RELATED APPLICATION DATA

This patent application is a continuation of U.S. patent application Ser. No. 10/045,654, filed Oct. 26, 2001 (U.S. Pat. No. 7,607,016), which is a continuation in part of U.S. patent application Ser. No. 09/951,143, filed Sep. 10, 2001 (U.S. Pat. No. 7,277,468) which is a continuation in part of U.S. patent application Ser. No. 09/938,870, filed Aug. 23, 2001 (U.S. Pat. No. 7,246,239), which is a continuation in part of U.S. patent application Ser. No. 09/840,016, filed Apr. 20, 2001 (U.S. Pat. No. 6,760,464). The above patent documents are hereby incorporated by reference.

TECHNICAL FIELD

The present invention relates to steganography, data hiding, and authentication of media, such as printed documents, images, video and audio signals.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. patent application Ser. No. 09/503,881 (U.S. Pat. No. 6,614,914) and U.S. Pat. No. 5,862,260, which are hereby incorporated by reference. Examples of other watermarking techniques are described in U.S. patent application Ser. No. 09/404,292, which is hereby incorporated by reference. Additional features of watermarks relating to security, authentication of media signals and/or fragile watermarks are described in U.S. patent application Ser. Nos. 09/731,456 (published as US 2002-0031240 A1), 60/198,138, 09/498,223 (now U.S. Pat. No. 6,574,350), 09/433,104 (now U.S. Pat. No. 6,636,615), 09/616,462 (now U.S. Pat. No. 6,332,031), 09/625,577 (now U.S. Pat. No. 6,788,800), 60/232,163, PCT/US01/23336 (published in English as WO 02/09019) and PCT/US01/28523 (published in English as WO 02/23468), which are each hereby incorporated by reference.

The invention provides a method of authenticating a media signal and related software, systems and applications. The method transforms at least a portion of the media signal into a set of frequency coefficients in a frequency domain. For example, it applies a Fast Fourier Transform (FFT) or other frequency transform to blocks of a media signal, such as an image, audio or video signal. It adjusts a relationship between selected frequency coefficients to a reference value. This adjustment is selected so that an alteration to be detected, such as a re-sampling operation or digital to analog-analog to digital conversion, alters the relationship. To detect the alteration, a detector computes the relationship in a potentially corrupted version of the signal. It then compares the result with a threshold value to detect whether the alteration has occurred.

A further aspect of the invention is a method of authenticating a media signal. The method evaluates signal peaks at selected frequency coefficients of the media signal. In a prior embedding process, the media signal has been modified to include peaks at the selected frequencies, such as by the technique summarized in the previous paragraph. The method determines, based on degradation of the signal peaks, whether the media signal has been altered. The frequency location of the peaks may vary from one application to the next. To detect, scanning and printing of watermarked images for example, the peaks are located at higher frequencies.

Another aspect of the invention is a watermark decoder, which includes a detector and analyzer for determining alteration of a watermarked media signal. The detector correlates a calibration signal with a media signal suspected of carrying a watermark to determine orientation parameters describing orientation of the media signal at embedding of the watermark. The calibration signal includes a set of peaks at selected frequency coefficients. The analyzer orients the media signal using the orientation parameters and evaluates whether examining signal peaks at selected frequency coefficients in the media signal has altered the media signal.

The invention also provides a method of measuring the quality of service of broadcast media signals by analyzing digital watermarks embedded in the received broadcast signal. This method enables the quality of the broadcast video or audio signal to be measured without having the original version of the signal before broadcast transmission. Instead, the method analyzes the strength or quality of the embedded digital watermark to determine the quality of the received broadcast signal.

One aspect of the invention is a method of measuring quality of service of a broadcast media signal using a digital watermark embedded in the broadcast media signal. The method extracts a digital watermark from the broadcast media signal, and evaluates the extracted digital watermark relative to a reference digital watermark to measure degradation in quality of service of the broadcast media signal based on differences between the extracted and reference digital watermarks.

The method is implemented using fragile watermarks embedded in the broadcast multimedia signal. These fragile watermarks, which are imperceptible in the broadcast signal, are based on digital watermarks used for authentication of media objects.

Another aspect of the present invention involves embedding an authentication metric in media. The metric can be embedded as a digital watermark payload. The metric is used as a benchmark to gauge signal quality (or strength, type, ratio, bit-error, relationship, etc.) or degradation for a digital watermark embedded in the media. The metric is extracted from media, compared to a calculated metric for the embedded digital watermark, and a determination is made whether the media is an original or a copy. In yet another aspect, to detect a potential alteration, a detector computes a metric for a potentially corrupted version of the embedded media. The detector then compares its computed metric to the embedded metric to detect whether an alteration has occurred. An alternation may include printing, scanning, digital capture, copying or editing of the media.

Further features will become apparent with reference to the following detailed description and accompanying drawings. The following description details a method for detecting whether an image has been scanned, printed or photocopied after being processed by the method. It also describes alternative implementations and applications.

DETAILED DESCRIPTION

Figure 1:
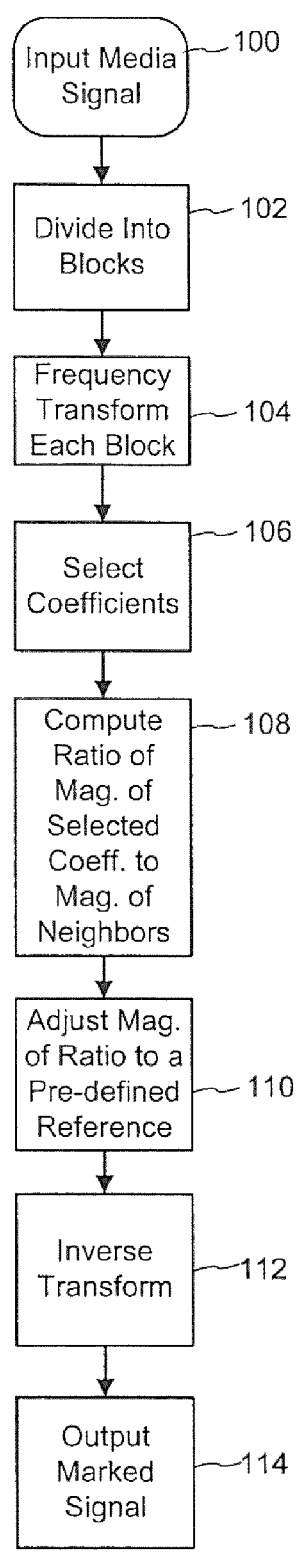
FIG. 1 is a flow diagram illustrating a process of embedding an authentication watermark in a media signal.

FIG. 1 is a flow diagram illustrating a process of embedding an authentication watermark in an input media signal (100), and in particular, in an image. The embedder begins by dividing a grayscale image into N×N blocks of samples at a specified resolution (102), where N is a pre-defined integer. For each block, the embedder computes a frequency transform of the image samples in that block (104), namely, a fast Fourier transform. From the mid-frequency and mid-high frequency coefficients, the embedder selects M Fourier transform coefficients (106), where M is a pre-defined integer. The coefficient locations are fixed by a pre-defined pattern. For example, the locations are scattered among roughly 25 to 100 coefficient locations in the mid to mid-high frequency range of a Fourier transform domain of a block of image samples where N ranges from 64 to 512 at spatial resolutions ranging from 75 to 600 dots per inch (DPI). The locations are symmetric about vertical and horizontal axes (and potentially diagonal axes) to facilitate detection as explained further below.

For each of the M selected coefficients, x, the embedder computes a ratio of the magnitude of a selected coefficient relative to the magnitude of its neighbors (108). In particular, it is a ratio of the magnitude of the selected coefficient to the average magnitude of the surrounding neighbors:

$r(x)$=Magnitude_of_$x$/Average_of_Magnitude_of_Eight_Neighbors_of_$x$

If $r(x)<r$, where r is a pre-defined reference value, the embedder increases the magnitude of x such that:

$r(x)=r$.

In this implementation, the value of r is a pre-defined constant. The reference may be derived dynamically from the input media signal. Also, the reference may be selected from a table of values so as to select the value of r in the table at the minimum distance from $r(x)$. The adjustment (110) to the host image is selected so as to be imperceptible or substantially imperceptible to a user in an output form of the watermarked signal.

Next, the embedder computes the inverse fast Fourier transform on each block to obtain the watermarked grayscale image (112). The watermarked image (114) may then undergo one or more transformations, such as digital to analog conversion, printing, scanning, analog to digital conversion, photocopying, etc. These transformations tend to corrupt the watermarked image in a predictable way.

The watermarking process of FIG. 1 may be combined with another watermarking process to embed other watermarks, either robust or fragile to transformations such as sampling distortions, geometric distortions, scaling, rotation, cropping, etc. In particular, the process may be combined with an embedding process described in pending U.S. patent application Ser. No. 09/503,881 or U.S. Pat. No. 5,862,260 to encode a calibration signal that enables a detector to compensate for distortions such as scaling, rotation, translation, differential scale, shear, etc. In one implementation, for example, the calibration signal comprises an array of impulse or delta functions scattered in a pattern in the Fourier domain of each block of image samples. To embed the pattern, the embedder perceptually adapts the calibration signal to the host image block and adds it to that block. The impulse functions of the calibration signal have a pre-defined magnitude and pseudo-random phase. To make the calibration signal less perceptible yet detectable, the embedder modulates the energy of the calibration signal according to the data hiding attributes (e.g., local contrast) of the image samples to which it is added. Preferably, the locations of the impulse functions are scattered across a range of frequencies to make them robust to transformations like spatial scaling, rotation, scanning, printing, and lossy compression. Further, they are preferably arranged to be symmetric about vertical and horizontal axes in the Fourier domain to facilitate detection after flipping or rotating the watermarked image.

The frequency coefficient locations selected for the method illustrated in FIG. 1 may be mutually exclusive or overlap the coefficient locations of the calibration signal. The calibration signal preferably has impulse functions at lower frequencies to survive compression, scanning, printing, etc. while the pattern of coefficients employed in FIG. 1 includes coefficients at locations that are likely to be impacted by alterations to be detected, such as printing, scanning and photocopying. In the case where they overlap, the modification of the coefficients according to FIG. 1 is implemented so as not to interfere with the calibration signal. In particular, the embedder adjusts the selected coefficients as shown in FIG. 1 after the impulse functions of the calibration signal have been introduced, or the embedder calculates the watermarked signal taking into account the changes of the coefficient values due to the calibration signal and the process of FIG. 1.

Another approach is to adjust the selected frequency coefficients in the method of FIG. 1 so that those coefficients act as both a calibration signal and an authentication signal. The locations of the coefficients for the method of FIG. 1 and the delta functions of the calibration signal are the same. The embedder increases the magnitudes of selected mid to mid-high frequency coefficients relative to their neighbors to achieve the desired relationship with neighboring coefficients for authentication purposes. Since this modulation includes the addition of a delta function to the selected coefficients, it also inherently embeds a calibration signal comprised of delta functions at the selected locations. To compensate for rotation and scale, the detector performs a Fourier Mellin transform of the suspect signal and the calibration signal into a log-polar space and then correlates the two signals. The location of the correlation peak in log polar space provides the spatial scale and rotation parameters. These parameters may then be used to compensate for rotation and scale changes before performing additional watermark decoding operations, such as the authentication operations of FIG. 2.

To compute translation, the delta functions added to the selected coefficients may be given a known pseudorandom phase. In this case, the detector correlates the phase information of the calibration signal with the suspect signal after compensating for rotation and scale. The location of the correlation peak gives the translation offset in the horizontal and vertical directions.

In addition to being integrated with other watermark signal components, the process of FIG. 1 may be combined with a robust watermark embedding process to carry a multi-bit message payload carrying metadata or a link to metadata stored in an external database. Example implementations for embedding this type of robust watermark are described in pending U.S. patent application Ser. No. 09/503,881 and U.S. Pat. No. 5,862,260.

Figure 2:
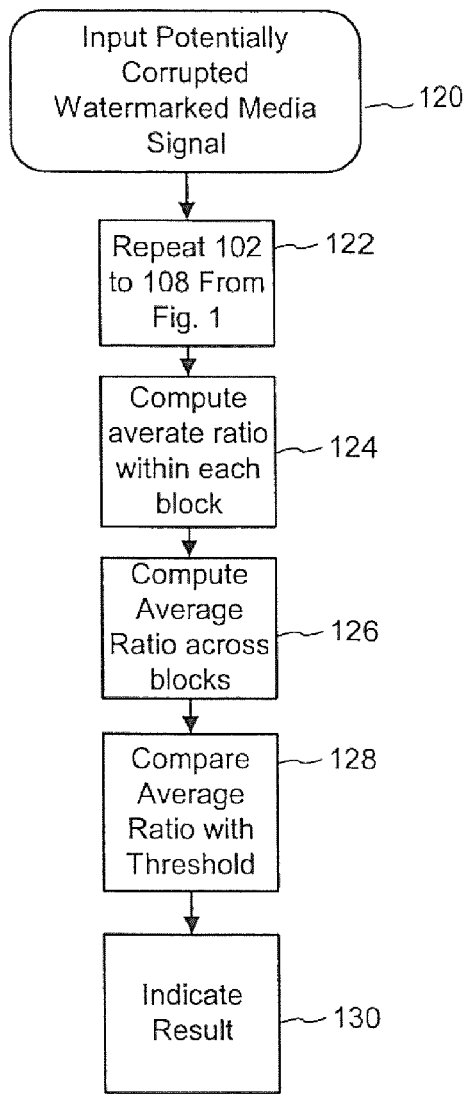
FIG. 2 is a flow diagram illustrating a process of detecting the authentication watermark from a potentially corrupted version of the watermarked signal.

FIG. 2 is a flow diagram illustrating a process of detecting the authentication watermark from a potentially corrupted version of the watermarked media signal (120) from the process of FIG. 1. The first four steps (122) are the same as shown in the embedder. For each block, the detector computes the average of r(x), where x is over all M selected coefficients (124), $R = \text{Average\_of\_}r(x)$ The detector computes the average of R over all blocks (126), $AR = \text{Average\_of\_}R$ A related approach is to use a weighted average as follows. For each block, the detector computes a weighted average of r(x), where x is over all M selected coefficients (124), $R = \text{Sum\_of\_(weight\_for\_location\_}x * r(x))$.

In this approach, the weights are fixed positive constants, independent of the image, with the weight sum equal to 1. For copy detection applications, the weight for each location is adapted for printers and printing substrates used to produce original printed items. The weighting factors are determined such that, for these printers and substrates, originals will be statistically optimally differentiated from copies. Based on our experiments, the weights in higher frequency components are usually higher. However the weights in the highest frequency components are actually tuned lower, because some reproduction devices (like photo copy machines) capture the highest frequency reasonably well, and the first (original) printing process introduces noise to the highest frequency components in the original printed items.

After obtaining the weighted average R for each block, the detector computes the average of R over all blocks (126), $AR = \text{Average\_of\_}R''$ To detect whether the watermarked signal has undergone alterations, the detector compares the average of R with a pre-defined threshold (128). If AR>=T, where T is a pre-defined threshold, then the detector classifies it as original. If AR<T, then the detector classifies it as a copy.

Depending on the application, the detector may indicate the result (130) to a user through some user interface (e.g., visual display, audio output such as text to speech synthesis, etc.). The detector may also indicate the result (130) to another software process or device to take further action, such as communicating the event to a another device or database for logging, recording tracer data about the user or device in which the alteration is detected, linking the detecting device to a network resource such as a web site at a specified URL that informs the user about usage rules, licensing opportunities, etc.

To make the process robust to geometric distortion, the detector includes a pre-processing phase in which it correlates a calibration signal with the potentially corrupted watermarked signal as described in pending U.S. patent application Ser. No. 09/503,881 or U.S. Pat. No. 5,862,260. Using a Fourier Mellin transform, the detector maps both the calibration signal and the received signal into a log polar coordinate space and correlates the signals (e.g., using generalized matched filters) to calculate estimates of rotation and scale. After compensating for rotation and scale, the detector uses the phase information of the calibration signal to compute translation, e.g., the origin or reference point for each block. Further correlation operations may be used to compute differential scale (e.g., the change in scale in the horizontal and vertical directions after watermarking). After compensating for geometric distortion, the detector executes the process of FIG. 2 to detect alteration in the selected frequency coefficients modified according to the method shown in FIG. 1.

While the invention is illustrated with respect to a specific implementation, it may be implemented in a variety of alternative ways. For example, the above example specifically refers to a grayscale image. This example may be adapted to other types of images including video and still imagery, color and monochrome images, etc. For color images, the embedding and detecting operations may be performed on two or more color channels, including luminance, chrominance or some other color channels. The embedding and detecting operations may be applied to frequency coefficients of alternative frequency transforms, such as DCT and wavelet, to name a few.

The embedding process shown in FIG. 1 may be performed on a portion of the host signal to create a watermark signal that is combined with the host signal. For example, in one possible implementation, the embedder pre-filters the host signal to yield a high pass filtered signal including content at the mid and high frequency ranges impacted by the watermark. The embedder makes the modification to this filtered signal, and then combines the resulting modified signal with the original signal.

The embedding and detecting processes may also be integrated into compression and decompression operations. For example, the frequency domain transform may be executed as part of a compression process, such as JPEG, JPEG 2000 or MPEG, where blocks of the signal are transformed into a frequency domain. Once converted to the frequency domain, frequency coefficients may be adjusted as described above.

The embedding and detecting operations apply to other media types, including audio media signals. In addition, the frequency domain coefficients may be selected and adjusted to reference values to detect other types of signal alteration, such as lossy compression, digital to analog and analog to digital conversion, downsampling and upsampling, etc.

Semi-Fragile Watermarks

A related watermarking approach is to use an array of Fourier magnitude impulse functions with random phase (a calibration signal, also referred to as a watermark synchronization or orientation signal) for semi-fragile, and copy and copy-attack resistant watermarks. Semi-fragile refers to a watermark that degrades in response to some types of degradation of the watermarked signal but not others. In particular for document authentication applications using such a watermark, the watermark decoder can determine if the watermark has been scanned and printed or battered by normal usage, potentially while being read with a web camera. The copy-attack relates to the assertion that one can use noise-reduction, i.e. Wiener filters, to lift a watermark and, then using threshold and masking techniques, one can re-embed it in a new image. Interestingly, these concepts are related because they both include an additional scanning and printing cycle, assuming the copy attack works on printed, not only digital, content. This type of semi-fragile watermark can be used to determine if a watermarked document has been copied, possibly using a high quality copier and low quality reader, and as such, can stop copying and can be used to measure quality of service.

One approach to implementing a semi-fragile watermark is to embed extra signal peaks in the Fourier magnitude domain that are of varying intensity, and have the watermark decoder determine if the watermark has been scanned and printed by the relative power of the extra and original calibration signal peaks. The extra peaks refer to a set of peaks used to implement the semifragile watermark. The original calibration signal peaks refer to the ones already included in the watermark to determine its orientation in a geometrically distorted version of the watermarked signal. For an example of such a calibration signal, see U.S. Pat. No. 5,862,260 and U.S. patent application Ser. No. 09/503,881, which are incorporated by reference. Some peaks are referred to as "extra" because they are included in addition to other peaks that form the original set of peaks in a calibration signal.

One advantage of including the semi-fragile watermark in the calibration signal is that the robust part of the watermark, which includes the desired detailed information such as a unique ID, is the multi-bit message, whereas the fragile part, which is only used to determine copying, is a few bit message. The fragile watermark can be considered as a single bit (copied or not) but actually allows more information by being frequency specific, as described below. Interestingly and potentially advantageously, the semi-fragile watermark is separate but inherently related to the robust watermark—thus they cannot be separated for successful copy attacks.

Specifically, the extra calibration signal peaks should be located at frequencies that best discriminates between the printing and scanning process, normal scuffing and a web camera reader. These locations can be determined by analyzing the frequency response of printing, scanning, scuffing and web cameras for frequency differences.

For example, a printing-scanning process may represent high-frequencies better than a camera, but not low frequencies. In addition, scuffing may show low-and-high frequency losses. Thus, the reader will be able to determine if the watermark has been copied, involving an additional scanning-printing process, by the relative intensities of the extra and original calibration signal peaks at low and high frequencies. In this example, high-and-low frequency loss is acceptable, whereas only low frequency loss represents a copied watermark.

In addition, the extra calibration signal peaks could also be dependent upon the content of the host signal, thus providing additional defense against the copy attack. For example, the host image samples could be broken in 16 equal sub-blocks, and the location of the extra peaks depends upon the average intensity of each quadrant to the total average intensity. Or, if only a section of the image is visible to the reader, each 32 by 32 sample block could be used in the above calculation instead of the complete image. Any "hash" of the host image that survives a web camera reader (referred to as a perceptual hash) could be used. To this end, if the watermark is moved to another picture, after it is read, it is less likely that the extra calibration signal peak locations are correct, not to mention that the less intense calibration signal points have been removed by the additional scanning-printing process.

Alternatively, in regards to the copy attack, the content dependent information could be used to slightly move the location of a few original calibration signal peaks, as opposed to adding extra calibration signal peaks. This means that the image content is implicitly in the calibration signal's jitter, and the copy attack is less likely to succeed unless the read and embedded images have the same perceptual hash. On the one hand, this approach may reduce robustness of the robust message to scaling, rotation and translation. On the other hand, no extra bits containing the output of the perceptual hash need to be embedded in the robust message.

Based upon a different basic approach for stopping the copy attack, one could create a 16-bit key from the perceptual hash described above (or similar key from any perceptual hash) and use it to encrypt (using RSA or DES) or scramble (using XOR) the payload and CRC bits before embedding them with an embedding protocol, which may include convolution and/or repetition. This means that the reader can only correctly decrypt or descramble the payload and CRC bits if the perceptual hash of the read image matches that of the embedded image. Thus, the copy attack is less likely to be successful without requiring extra bits to be included to carry the output of the perceptual hash. This 16-bit key could use any method of feature based identification or vector creation, such as listed in U.S. Pat. Nos. 4,677,466, 5,436,653, 5,612,729, 5,572,246, 5,621,454, and 5,918,223, and PCT patent applications WO01/20483 and WO01/20609, which are hereby incorporated by reference.

Broadcast Monitoring and Quality of Service with a Watermark

When content is watermarked with a unique identifier (ID), any receiver with a watermark detector can monitor what content is retrieved. The content can be identified by name via resolving the ID in a secondary database that contains at least IDs and related names, potentially including content owners who should be informed that the content was distributed. The assignee has several patent applications related to this invention. See, for example, U.S. patent application Ser. Nos. 09/571,422, filed May 15, 2000 (U.S. Pat. No. 6,947,571), 09/563,664, filed May 2, 2000 (U.S. Pat. No. 6,505,160), and 09/574,726, filed May 18, 2000, which are incorporated herein by reference.

However, an interesting improvement is that the quality of the watermark can be measured and used to measure quality of service for the distributor, who most likely is a broadcaster who wants to know that its broadcasts are being received with high-quality.

The quality of the watermark can be determined in many fashions including using semi-fragile watermarks as described in this document with the application of copy resistance in mind. Measuring the degradation of the watermark in the received media signal provides an indicator of quality of service.

For a packet distribution system, such as IP (Internet Protocol), a Quality of Service (QoS) method based upon semi-fragile watermarks is better than looking for dropped packets since it determines the effect of those packets on the video or audio. Many Internet video and audio players can re-create packets, and during times of slow scene changes, the quality may not be degraded badly. In addition, when the digital watermarks embedded in the packet stream have time segmented payloads that repeat at a defined or synchronized interval in the video or audio, the QoS of the video or audio can be measured over time by measuring the quality of the imperceptible digital watermark in the received video or audio stream.

Measuring the Watermark Signal for Authentication and Quality of Service

There are multiple metrics for assessing watermark strength, including the degree of correlation between the reference watermark signal and the detected watermark signal, and a measure of symbol errors in the raw message estimates of the watermark message payload. One way to measure the symbol errors is to reconstruct the raw message sequence using the same error correction coding process of the watermark embedder on the valid message extracted from the watermark. This process yields, for example, a string of 1000 binary symbols, which can be compared with the binary symbols estimated at the output of the spread spectrum demodulator. The stronger the agreement between the reconstructed and detected message, the stronger the watermark signal.

To illustrate this method, it is useful to review how to embed the digital watermark message signal imperceptibly in the host media signal. In the embedder, the embedded bit sequence is created by error correction encoding a message payload, such as BCH coding, turbo coding, convolutional coding, Reed Solomon, etc. This embedded bit sequence is then spread spectrum modulated with a carrier signal, such as a pseudorandom sequence and embedded into the host media signal by subtly modifying the signal (e.g., adding a binary antipodal watermark signal resulting from the spread spectrum modulation to spatial or frequency domain samples of the host media signal).

Now, referring to the watermark detector, an approach for measuring the strength of the watermark signal is as follows:

1. Use the message payload read from the watermark to re-create the original embedded bit sequence (including redundantly encoded bits from error correction coding) used for the watermark.

2. Convert the original bit sequence so that a zero is represented by −1 and a one is represented by 1.

3. Multiply (element-wise) the soft-valued bit sequence used to decode the watermark by the sequence of step 2. In particular, the digital watermark reader produces a soft-valued bit sequence estimated from spread spectrum demodulating the watermark signal, and supplies the soft-valued sequence to the error correction decoder, such as a Viterbi decoder, which produces an error corrected message payload. The soft-valued sequence represents an estimate of the original, error correction encoded bit sequence values along with a probability or confidence value for each bit sequence value. The reader derives the soft value by aggregating (e.g., summing) the estimates from demodulated chips of the spread spectrum sequence used to encode that bit.

4. Create one or more measures of watermark strength from the sequence resulting in the previous step. One such measure is the sum of the squares of the values in the sequence. Another measure is the square of the sum of the values in the sequence. Other measurements are possible as well. For example, soft bits associated with high frequency components of the watermark signal may be analyzed to get a strength measure attributed to high frequency components. Such high frequencies are likely to be more sensitive to degradation due to photocopying, digital to analog and analog to digital conversion, scanning and re-printing, broadcast process distortion, etc.

5. Compare the strength measures to thresholds to decide if the suspect image has been captured from an original or a copy of the printed object. For print object authentication, the threshold is derived by evaluating the difference in measured watermark strength of copied vs. original media objects on the subject printer platform used to create the original, and a variety of copiers, scanners and printers used to create copies. For quality of service measurement, the measurement of watermark signal strength at a receiver provides an indicator of video or audio signal quality at the receiver.

This same technique of measuring symbol errors can be applied to two or more different watermarks embedded at different spatial resolutions. Each of the watermarks may have the same or different message payloads. In the first case where the watermarks have the same message payloads, the message extracted from one of the watermarks may be used to measure bit errors in each of the other watermarks. For example, the message payload from a robust watermark embedded at a low spatial resolution may be used to measure the bit errors from a less robust watermark at a higher spatial resolution. If the watermarks carry different message payloads, then error coding, such as convolutional, Reed Solomon, or Turbo coding, and error detection bits, such as CRC bits, can be used in each message payload to ensure that the message is accurately decoded before re-creating the original, embedded bit sequence.

Using two or more different watermarks enables a threshold to be set based on the ratio of the signal strength of the watermarks relative to each other. In particular, the signal strength of a first watermark at a high resolution (600-1200 dpi) is divided by the signal strength of a second watermark at a lower resolution (75-100 dpi). In each case, the signal strength is measured using a measure of symbol errors or some other measure (e.g., correlation measure).

If the measured strength exceeds a threshold, the detector deems the watermark signal to be authentic and generates an authentication signal. This signal may be a simple binary value indicating whether or not the object is authentic, or a more complex image signal indicating where bit errors were detected in the scanned image. For quality of service measurement, the ratio of signal strength provides a measure of the quality of service.

The watermark and host signal can be particularly tailored to detect copying by photo-duplication and printing/re-scanning of the printed object. Likewise, the watermark signal can be tailored to detect video quality degradation for quality of service measurements. This entails embedding the watermark at particular spatial and/or temporal frequencies/resolutions that are likely to generate message symbol errors when the object is re-printed or broadcast. This detection process has an additional advantage in that it enables automatic authentication and/or quality of service measurement, it can be used with lower quality camera devices such as web cams and common image scanners, and it allows the watermark to serve the functions of determining authenticity as well as carrying a message payload useful for a variety of applications. For video quality of service measurements, the detection process can take place in the same hardware used to handle the video signal (assuming the video has a digital representation).

The message payload can include an identifier or index to a database that stores information about the object or a link to a network resource (e.g., a web page on the Internet). The payload may also include a covert trace identifier associated with a particular authentic item, batch of items, printer, or distributor. This enables a counterfeit object, or authentic object that has been printed without authority to be detected and traced to a particular source, such as its printer, distributor or batch number.

The payload may also carry printer characteristics or printer type information that enables the watermark reader to adapt its detection routines to printer types that generated the authentic object. For example, the payload may carry an identifier that specifies the type of print process used to create the authentic image, and more specifically, the attributes of the halftone screen. With this information, the reader can check authenticity by determining whether features associated with the halftone screen exist in the printed object. Similarly, the reader can check for halftone screen attributes that indicate that a different halftone screen process has been used (e.g., a counterfeit has been created using a different halftone screen). One specific example is a payload that identifies the halftone screen type and paper type. The reader extracts this payload from a robust watermark payload and then analyzes the halftone screen and paper attributes to see if they match the halftone type and paper type indicated in the watermark payload. For example, the halftone type can specify the type of unstable screen used to create an authentic image. If this unstable screen is not detected (e.g., by absence of a watermark embedded in the unstable screen), then the image is considered to be a fake.

A related approach for analyzing halftone type is to look for halftone attributes, like telltale signs of stochastic halftone screens vs. ordered dither matrix type screens. Dither matrix screens used in low end printers tend to generate tell tale patterns, such as a pattern of peaks in the Fourier domain that differentiate the halftone process from a stochastic screen, such as an error diffusion process, which does not generate such tell-tale peaks. If the reader finds peaks where none were anticipated, then the image is deemed a fake. Likewise, if the reader finds no peaks where peaks were anticipated, then the image is also deemed a fake. Before performing such analysis, it is preferable to use the embedded digital watermark to realign the image to its original orientation at the time of printing. Attributes due to the halftone screen can then be evaluated in a proper spatial frame of reference. For example, if the original ordered dither matrix printer created an array of peaks in the Fourier domain, then the peak locations can be checked more accurately after the image is realigned.

For quality of service measurement of broadcast signals, the payload may be used to carry information about the type of broadcast, or type of video processing used to create the broadcast video. The detector can then use this information to adapt the watermark signal measurements for the type of broadcast or video processing environment. For example, for certain types of broadcasts, watermark signal measurement can be made at selected frequencies and/or particular locations within the broadcast data stream. Also, the payload can be used to trigger certain types of quality measurements on surrounding frames of video from which the payload was extracted, and/or on particular parts of the frame where the watermark has been specifically embedded for quality of service measurements.

The above methods for measuring quality of service of video and audio broadcasts apply to both radio frequency broadcasts as well as digital network broadcasts, just to name a few examples. In the case of a digital signal, the quality of the received "raw" digital signal can be judged by any number of Channel State Measurement techniques that have been proposed. In the context of multimedia transmitted digitally over a network (like the internet), there can be congestion and packet losses. In this case, the communication channel does not have a guaranteed bandwidth; it only has some statistical description of availability. For video and audio, the solution is to use buffers at the receiver and transmitter to even out the statistical fluctuations in bandwidth. Still, there may be temporary periods with frame dropouts and/or other distortion artifacts. In these cases, quality of service monitoring is used to determine the quality of the reception over the network. The receiver can measure quality by determining when frames of video or audio have been lost or delayed. In addition, digital watermarks embedded in the video and/or audio can be used to give a more accurate measure of the actual quality of the delivered video; additionally, it has the advantage that it is independent of the video/audio coding standard used. In the case of quality of service monitoring on networks, the digital watermarks are preferably embedded temporally, as well as spatially (for media signals with a spatial component like video).

The digital watermark is embedded temporally by embedding it across time segments, such as by spreading and/or repeating the watermark signal across multiple frames, so that the watermark detector can assess the degradation of the watermark over those time frames. For instance, the watermark can be spread over time just as it is spread over space by spread spectrum modulating the watermark message with a carrier signal that spans a particular sequence of time frames. The message can then be repeated over blocks of these time frames. The watermark may also carry a time dependent payload so that time frames where the video or audio signal has been degraded can be identified through the payload. For example, portions of the stream where a watermark payload cannot be decoded indicate portions of the stream where the quality of service has been degraded.

Enhanced Security Features

For enhanced security, various elements of a watermark's embedded data may be encrypted. Some or the entire watermark message, including the security data in the message, may be encrypted. Various keys used to encode the watermark may be encrypted as well. For example, a key that defines the location of a watermark signal in a host signal may be encrypted. A key used to decode the spread message signal (e.g., a pseudorandom number) may also be encrypted.

In implementations where instances of the watermark signal are repeated in the host signal, a key in the message payload of one instance of a watermark signal may be used to decrypt a message, such as security data, in other instance of the watermark signal. Or the key in one watermark signal payload may be used to decrypt a payload of a second watermark signal. The key may be included in a message payload by appending the key to the message or combining it with the message using some function such as an XOR, or multiplication operation that combines the key with the message to create a composite message.

Keys used to decode the watermark or its message payload may also be derived from the host signal itself or from another watermark in the host signal.

Digital watermarks provide a low cost, yet secure method of embedding security data into a product or its packaging. The embedding process can be integrated into the process of printing the object or its packaging. For example, for each product, the printing process may be adapted to print an image embedded with the product's identifier or hashed form of it. This process may be integrated in the mass production of a variety of printable objects, like packaging, containers, labels, product documentation, credit cards, etc.

Copy Detection

The security of embedded data can be enhanced through the use of copy detection technology. Copy detection technology can be used to detect whether a counterfeiter has made a copy of the object bearing the embedded security data. For example, a counterfeiter might try to circumvent the authentication system by making a high quality copy of the image bearing the embedded security data using a scanner or copy machine, and then printing that image on a counterfeit product or its packaging.

The copy detection technology may be used to embed the security data (e.g., a watermark that is used to detect copying and convey security data) or may be separate from the security data (a separate watermark or other auxiliary data that is used to evince copying). One form of copy detection technology is a digital watermark that is altered in a predictable way when copied with a scanner, copy machine, or other imaging device. Such imaging devices apply a transformation to an image (e.g., an analog to digital sampling, color transformation, etc.) that can be detected by a watermark designed to change in a predictable way to such a transformation.

An example of copy detection technology is a "fragile" watermark. The watermark is called fragile because the strength (or other signal characteristics) of the watermark signal in a copy of the watermarked original object is less than the strength in the original object. To detect copying, the embedded data decoder attempts to detect the fragile watermark. If the fragile watermark is not present, or has a measured strength that falls below a threshold, then the decoder deems the object to be an invalid copy. There are a variety of ways to measure strength of a watermark signal. One way is to measure the extent of the correlation between an image of the suspect object and a reference fragile watermark signal.

Rather than using a separate fragile watermark, an authentication system may detect copying based on attributes of the watermark used to carry the embedded data. For example, the watermark may include a synchronization or orientation signal used to detect the presence of the watermark and determine its orientation. Copying of a watermarked object may be detected by measuring changes in the watermark orientation signal.

Since the watermark carrying the embedded data is made to survive distortion due to normal scanning operations required to read the watermark from an object, a fragile watermark may not accurately discern copying by a counterfeiter from these normal transformations. However, the watermark payload may be embedded in ways that survive these normal operations, yet still carries information from which copying can be discerned. For example, the payload of the watermark may be robustly encoded to withstand transformations due to scanning, geometric distortion, etc., yet convey information from which copying can be discerned. One type of copy detection payload is an identifier that is related to some other characteristic of the object (another machine readable code, like a bar code, magnetic stripe, hologram, etc.).

While the decoding process can use the orientation signal to align each block, it may not be able to discern the precise alignment of blocks in the scanned image relative to blocks in the original watermarked image. As such, the decoder may only be able to recover the relative location of blocks to each other, but not their absolute location in the original image. To address this challenge, the variation of the watermark or its payload across the image can be made in a relative manner from one block to the next using a secret key that defines the relationship between blocks. Relative changes between neighboring blocks enable the decoder to extract the payload from one block using information from one or more neighboring blocks. The relationship between the payloads of adjacent blocks may be defined according to a cryptographic function. For example, the payload of one block may be used as a key to decoding an adjacent block.

A related enhancement is to use keys for decoding the watermark, the watermark payload, or digital content that are dependent on the host signal. This type of host signal dependent key makes it difficult to copy the embedded security data from one object to another. To illustrate this enhancement, consider embedded security data in an image watermark on a product, packaging, or label. One form of image dependent key is a key that is derived from a property of the image that is insensitive to the changes due to the watermark embedding process and recoverable in a watermark decoding operation on the embedded product.

An example of this type of key is a number that is derived from statistical properties of the image that are insensitive to the watermark embedding process, like the relative power differences between blocks of the image. The key could be, for instance, a binary number computed by comparing the power of a given block with a set of other blocks, such as those in a predetermined neighborhood around the given block. The comparison operations yield a one or zero depending on whether the power of the given block is greater or less than the selected neighbors. Each comparison operation yields a single bit in the key. The key may then be appended or combined with the watermark payload.

At the time of authentication, the watermark decoding process employs a synchronization or orientation signal to align the image data. Then it re-computes the image dependent key by repeating the key derivation operation as computed in the embedding process. The key computed at the time of decoding may be compared with the embedded key to check authenticity of the embedded data. Other properties that are insensitive to the watermark process may be used as well.

Another enhancement that can be used as a form of authentication and copy detection is to embed two or more different watermarks that have a known relationship with respect to each other. One such relationship is a predetermined offset in the spatial image domain, or some other transform domain, like a Discrete Fourier Transform, Discrete Cosine Transform, Discrete Wavelet Transform, or some re-sampling of one of these domains, like a log, log-log, or log-polar re-sampling. This known relationship changes in a predictable way when the watermarked object is copied. Thus, during the authentication process, a watermark decoding process detects the watermarks and computes this relationship between the watermarks. It then compares the computed relationship with the known relationship to determine whether some unauthorized transform likely occurred, such as copying.

One way to detect whether a printed object (e.g., a document, label, ticket, box) has been copied is to embed two watermark signals with different characteristics that change differently in response to reproduction operations such as photocopying, or digital scanning and re-printing. To differentiate a copy from an original, the watermark decoder measures the characteristics of both watermarks in a digital image scan of the printed object, and detects a copy by the changes in the watermarks attributable to reproduction operations. Examples of this approach are described in U.S. patent application Ser. No. 09/433,104, entitled Methods and Systems Using Multiple Watermarks, by Geoff Rhoads and Ammon Gustafson, which is hereby incorporated by reference. Four approaches are listed in this document, including:

1. high and low spatial resolution watermarks;
2. one watermark with a geometrically linear assignment of pixels and another with a random assignment of pixels;
3. low and high power watermarks; and
4. one watermark with a standard RGB to HSI-HSI to RGB transform and a second watermark that is biased before being transformed from HSI to RGB.

In the first case, the high-resolution watermark is degraded more than the low-resolution watermark. The watermark detector detects copying by measuring the change in the power ratio between the two watermarks in a suspect image relative to the original ratio, which is set at embedding and provided to the detector. In the other cases, the detector detects copying by observing changes in the relative strengths of the detected watermark signals with respect to the original relationship between the watermarks.

Similar techniques may be used to create a fragile watermark that evidences copying due to changes in the fragile watermark's strength relative to its original strength in the unmanipulated original printed object. Also, the fragile watermarks may be adapted to carry a message payload. Finally, the fragile watermarks may be spatially replicated in contiguous blocks of the image. The detector can then isolate the spatial location of blocks of the image where the fragile watermark or watermarks evidence tampering.

The above sections refer to encryption and decryption operations. A variety of cryptographic technologies may be used to implement these operations. Some examples of encryption technologies include RSA, DES, IDEA (International Data Encryption Algorithm), skipjack, discrete log systems (e.g., El Gamal Cipher), elliptic curve systems, cellular automata, etc.

The above sections also refer to hash operations and in some cases, cryptographic hashes. Cryptographic hashes are functions used to convert a first number into a relatively unique second number in a manner that makes it difficult to derive the first number from the second number. Examples of hashing functions include MD5, MD2, SHA, and SHA1.

Including an Authentication Metric in a Watermark Signal

As discussed above a fragile (or semi-fragile) watermark is designed to degrade or alter when copied. An authentication metric is included in a digital watermark signal to help measure or gauge such degradation. In this sense an authentication metric provides a benchmark. An authentication metric is preferably a measure or characteristic of an original digital watermark signal. To detect a potential alteration, a digital watermark detector computes a metric for a potentially corrupted version of the digital watermark signal. The detector then compares its computed metric to the embedded metric to detect whether an alteration has occurred. An alteration may include printing, scanning, copying or editing of the digital watermark signal. An alteration typically occurs when the host media signal is similarly altered.

Examples of suitable authentication metrics include watermark signal strength, a watermark correlation value, a ratio of values, a power ratio between two watermarks, power or energy of a watermark component, a Fourier magnitude peak value, a peak location in a Fourier domain, or location for a watermark component, orientation or synchronization signal strength, Fourier characteristics of the orientation signal, signal gain, a threshold level, signal distortion level, bit-error relationship, e.g., for a watermark message, watermark signal corruption level and a signal to noise ratio. A metric can also include information regarding the type of rendering device (e.g., which type of printer printed the media from which a metric is generated) or an acceptable tolerance value or range for various detecting devices (e.g., digital cameras, optical sensors, etc.). Or the metric may include a color space description used by a rendering device. For instance, if a printer prints spot colors it could describe the spot colors used, perhaps using Pantone numbers or the like. Of course other degradation or copy detection measures disclosed in this document and in the incorporated by reference patent documents can also be used as suitable metrics. Moreover, any digital watermark characteristic that can be used to determine a copy from an original signal can be included in a digital watermark as an authentication metric.

Figure 3:
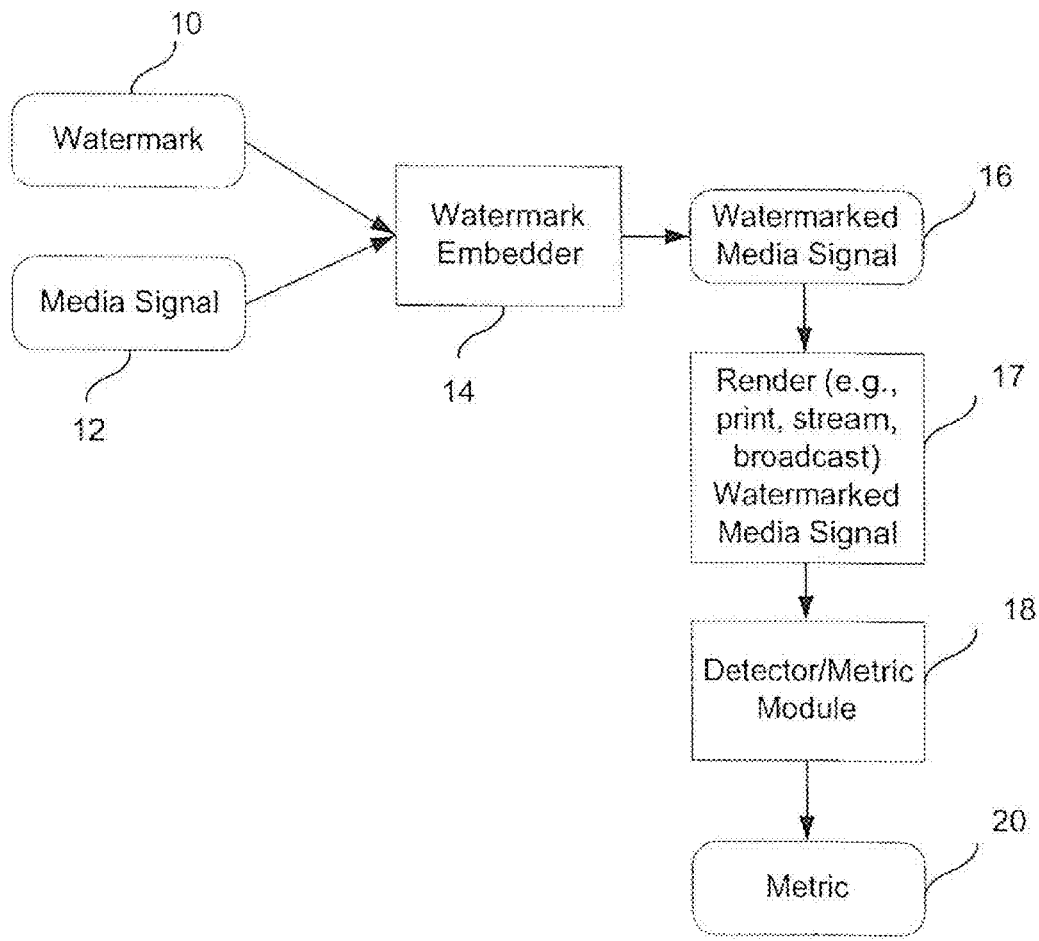
FIG. 3 is a functional block diagram illustrating an authentication metric generating process.

With reference to FIG. 3, a digital watermark 10 is embedded in a media signal 12 by watermark embedder 14. Digital watermark 10 is preferably a fragile watermark, in that it is altered or degrades with signal processing such as scanning, printing, editing, digital capture or copying. Various fragile watermarking techniques are disclosed in this and the incorporated by reference patent documents. Embedder 14 may optionally determine a suitable digital watermark based on a perceptual analysis of the media signal 12, a mask, human visual considerations, robustness requirements, required signal gain, etc., etc. Media signal 12 preferably corresponds to a digital signal representing, e.g., an image, graphic, photograph, file, artwork, video, and audio/video signal, etc. Embedder 14 outputs a digitally watermarked media signal 16. The digitally watermarked media signal 16 is preferably rendered (e.g., printed, streamed, or broadcast if video or audio) 17. A watermark detector 18 reads the watermark 10 from the rendered media signal 17. The detector 18 (or a metric module in communication with detector 18) determines an authentication metric 20 for watermark 10 as embedded in rendered media 17.

As a modification to the FIG. 3 embodiment, Detector/Metric Module 18 analyzes watermarked media signal 16 directly, without analyzing a rendered media signal 17, to generate a corresponding metric 20. In one embodiment of this modification, degradation caused by legitimate (e.g., future) rendering is predicted (e.g., with a statistical estimation). Metric 20 is adjusted to accommodate the degradation prediction. Degradations may be a function of the media signal (12 or 16) or of an anticipated rendering process. For example, a prediction or estimate of how the watermark 10 degrades, e.g., as a function of media signal 12's local characteristics and/or using knowledge of the anticipated legitimate media rendering system (e.g., a printer, broadcaster, etc.) is included in metric 20. Or metric 20 is adjusted to reflect such a prediction.

Figure 4A:
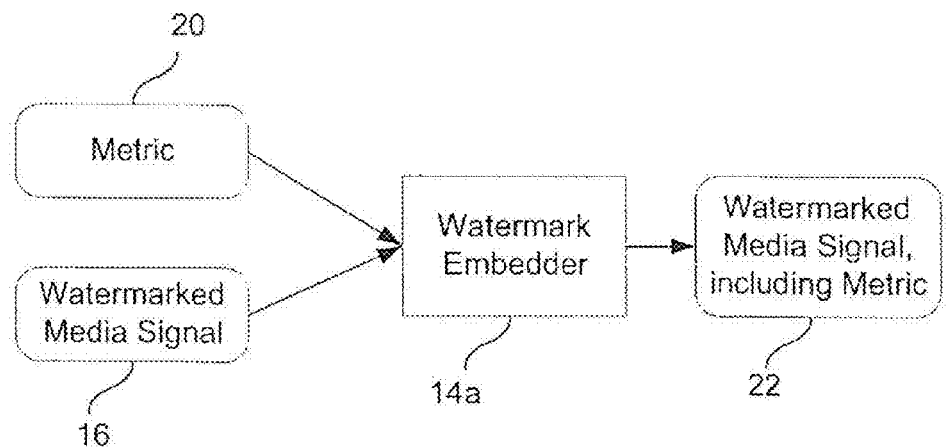
FIG. 4a is a functional block diagram illustrating an authentication metric embedding process.

With reference to FIG. 4a, metric 20 is embedded in the watermarked media signal 16 by embedder 14a. Metric 20 is preferably embedded as a watermark 10 payload or as a multi-bit message. Alternatively, metric 20 is embedded as a new watermark 10 component or as a separate digital watermark. Regardless of the embedding technique, metric 20 is included in or carried by a digital watermark. This digital watermark is preferably a fragile watermark. (Alternatively, metric 20 is embedded in a robust watermark. In this case, media signal 16 preferably includes a fragile watermark or fragile watermark characteristics from which metric characteristics can be determined). Embedder 14a generates a watermarked media signal 22, which carries metric 20 embedded therein. Embedding metric 20 preferably does not significantly alter the metric characteristics of the original digital watermark signal (e.g., the signal from which metric 20 was determined).

Figure 4B:
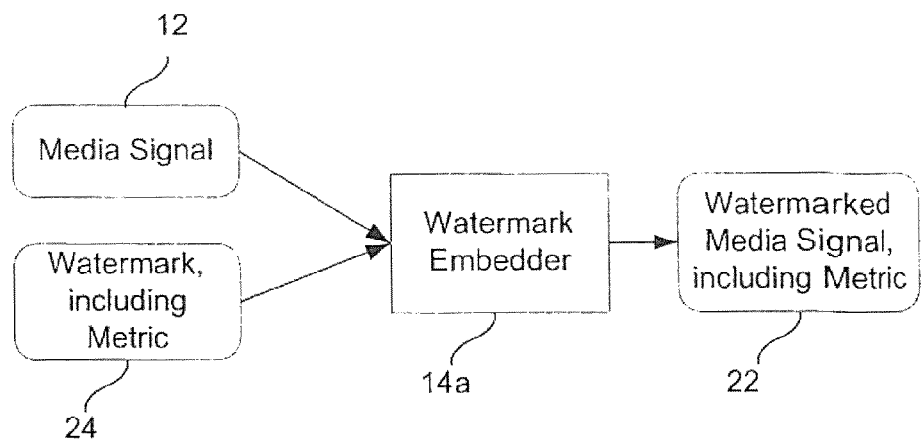
FIG. 4b is a functional block diagram illustrating another authentication metric embedding process.

As an alternative metric embedding process, and with reference to FIG. 4b, media signal 12 is embedded with a watermark 24 to yield a watermarked media signal 22. Watermark 24 combines watermark 10 and metric 20 so that a metric analysis of the unaltered watermarked media signal 22 (or a printed version of such) yields a metric that is comparable to or consistent with metric 20.

It should be noted that embedder 14 (FIG. 3) and embedder 14a (FIGS. 4a and 4b) can be the same embedder or can embed according to the same embedding protocol or format. Alternatively, in the event that metric 20 is embedded as a separate digital watermark, embedders 14 and 14a embed using different protocols, formats or techniques, so long as a new metric analysis of an unaltered watermarked media signal 22 (or a printed version of such) does not yield a metric that is significantly different than metric 20.

Watermarked media signal 22 is preferably rendered (e.g., printed, streamed or broadcast) as watermarked media 30. Watermarked media 30 includes metric 20 embedded therein. (A few examples of watermarked media 30 include product tags or labels, identification cards and documentation, passports, licenses, stock or bond certificates, digital signals, deeds and other legal documents, company logos, paper, product packaging, audio and video broadcasts, sports and other trading or game cards, advertisements, printed media, envelopes, letterhead and stationary, books, stickers, business cards, fabric, clothing, etc., etc. Of course this is not an exhaustive list, but rather is provided as examples of watermarked media 30).

Figure 5:
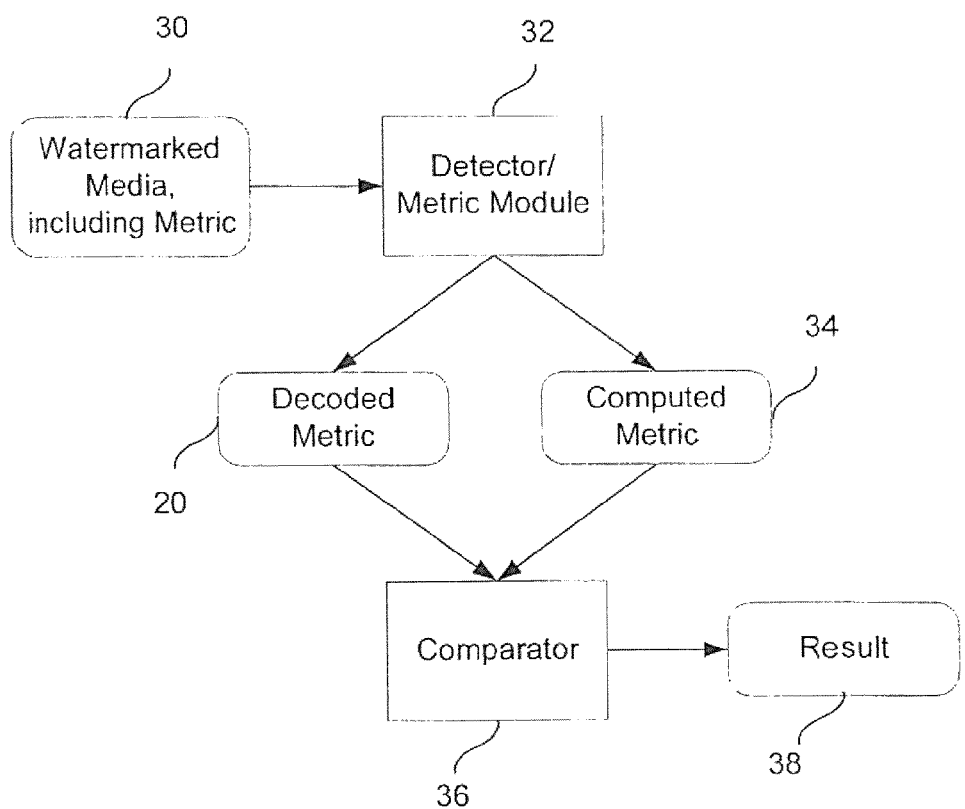
FIG. 5 is a functional block diagram illustrating a process of detecting a potentially corrupted version of a watermark signal based on an embedded authentication metric.

With reference to FIG. 5, Detector/Metric Module 32 reads and decodes the digital watermark embedded within media 30. (As with Detector/Metric Module 18 illustrated in FIG. 3, the detector functions and metric functions of module 32 need not be carried out by the same module or application. Indeed, a separate detector module and a metric module can be employed). Detector 32 preferably decodes metric 20. For example, if metric 20 is embedded as a payload or plural-bit message, detector 32 reads and decodes the payload or message. Or if metric 20 is a separate component or signal, detector 32 similarly reads and interprets metric 20. Detector/Metric module 32 analyzes the watermark signal embedded within media 30 to determine metric 34. Preferably, metric 34 is generated (or calculated) based on the same (or corresponding) criteria, algorithm or method as is used to generate metric 20. For example, if metric module 18 determines metric 20 based on Fourier characteristics of a watermark orientation signal, then metric module 32 also examines the Fourier characteristics of the watermark orientation signal to determine metric 34. (As an alternative arrangement, a digital watermark includes a payload (or message) indicating how metric 20 was calculated. In this alternative, metric module 32 is versatile, comprising the ability to generate metric 34 according to the specified metric 20 generation criteria. Metric generation criteria and/or metric 20 can even be encrypted for further security).

Comparator 36 compares metric 20 and metric 34 and a result 38 is output or determined. If metric 20 and metric 34 relate the watermarked media 30 is considered authentic and/or unaltered. As discussed in this and in the incorporated by reference patent documents, a fragile watermark degrades or is altered when process (e.g., photocopied, scanned and then printed, etc.). Metric 34 provides a benchmark to gauge this degradation. Accordingly, watermarked media 30 is considered altered/copied if metric 34 does not relate with benchmark metric 20. The term "relate" is defined broadly to encompass a case where the metrics coincide (or match) and a case where metric 34 falls within predetermined tolerance of metric 20. For example, if metric 34 is within plus/minus 1-25% of metric 20, then watermarked media 30 is considered authentic and/or unaltered. (Of course, different tolerance ranges can be used according to authenticity requirements). Similarly, when metric 20 represents a threshold value, and metric 34 falls sufficiently below the threshold, then metrics 20 and 34 are considered not to relate. The term sufficiently in this case can again be accessed according to a predetermined tolerance range.

In one embodiment, metric 20 includes printer or other rendering device information. This information conveys the type of printer (or other device) that was used to print (or broadcast) media signal 17, i.e., the signal from which metric 20 was generated. Comparator 36 uses the device information to calibrate its comparison process. For instance, it might be understood that embedded media printed by Printer Z yields a metric that is a predetermined percentage below a metric for the embedded media if printed by Printer Y. The comparator can adjust its comparison to compensate. Or when metric 20 includes color space information, e.g., spot color information, and comparator 36 (or metric 34) determines that media 30 contains only CMYK (or RGB) colors, it determines that media 30 is a reprint. Of course similar comparisons can be made based on other color space information.

Hence, a digital watermark includes a benchmark metric to identify media alterations.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. The particular combinations of elements and features in the above-detailed embodiments are exemplary only; the interchanging and substitution of these teachings with other teachings in this and the incorporated-by-reference patents/applications are also expressly contemplated.

The methods, processes, and systems described above may be implemented in hardware, software or a combination of hardware and software. For example, the embedding processes may be implemented in a programmable computer or a special purpose digital circuit. Similarly, detecting processes may be implemented in software, firmware, hardware, or combinations of software, firmware and hardware. The methods and processes described above may be implemented in programs executed from a system's memory (a computer readable medium, such as an electronic, optical or magnetic storage device).

What is claimed is:

1. A method comprising:
   obtaining data representing video or audio at a watermark encoder;
   transforming the data into a transform domain;
   analyzing the transform domain to identify a plurality of transform coefficients according to a predetermined criteria;
   altering the plurality of transform coefficients to cause the data to carry a digital watermark; and
   analyzing the data that is carrying the digital watermark to determine a metric.

2. The method of claim 1, wherein the digital watermark comprises a calibration signal.

3. The method of claim 1, further comprising:
   transforming the data that is carrying the digital watermark into a second transform domain;
   analyzing the second transform domain to identify a second plurality of transform coefficients according to a second predetermined criteria;
   altering the second plurality of transform coefficients to cause the data to carry a second digital watermark wherein the second digital watermark comprises the metric.

4. The method of claim 3, wherein the second digital watermark comprises a fragile watermark.

5. The method of claim 1, wherein the data that is carrying the digital watermark is analyzed after the data is rendered.

6. The method of claim 1, further comprising:
transforming the data without the digital watermark into a second transform domain;
analyzing the second transform domain to identify a second plurality of transform coefficients according to a second predetermined criteria;
altering the second plurality of transform coefficients to cause the data to carry a second digital watermark wherein the second digital watermark comprises the metric.

7. The method of claim 1, wherein the digital watermark comprises a payload that indicates at least one of a type of the data, an indication of how the metric was calculated, a location of a second digital watermark, a trace identifier, a link to a network resource, a type of data creation device, an orientation of the data or a multibit payload message.

8. The method of claim 7, wherein the payload is encrypted.

9. The method of claim 1, wherein the digital watermark is determined based on at least one of a perceptual analysis of a media signal, a mask, a human visual consideration, a robustness requirement, or a required signal gain.

10. The method of claim 1, wherein the predetermined criteria comprises at least one of an indication of a content of the data or a perceptual hash of the data.

11. A method comprising:
obtaining data representing video or audio at a watermark encoder;
compressing the data by transforming the data into a transform domain;
analyzing the transform domain to identify a plurality of transform coefficients; and
altering the plurality of transform coefficients to carry a digital watermark, in which the digital watermark is provided so as to allow detection of signal compression.

12. The method of claim 11, wherein the digital watermark comprises a calibration signal.

13. A method comprising:
obtaining data representing video or audio at a receiver, wherein the data comprises a digital watermark;
decoding the digital watermark at the receiver;
decoding a first metric from the digital watermark;
measuring a second metric from the data representing the video or audio; and
generating an indication about the data based on a comparison of the first metric and the second metric wherein the indication indicates at least one of an authentic data source, an unaltered state, a quality measurement of the data, or a type of rendering device.

14. The method of claim 13, wherein the indication comprises a measurement of a tolerance between the first metric and the second metric.

15. A device comprising:
a receiver configured to
obtain data representing video or audio; and
a watermark encoder operatively coupled to the receiver and configured to
transform the data into a transform domain,
analyze the transform domain to identify a plurality of transform coefficients according to a predetermined criteria,
alter the plurality of transform coefficients to cause the data to carry a digital watermark; and
analyze the data that is carrying the digital watermark to determine a metric.

16. The device of claim 15, wherein the digital watermark comprises a calibration signal.

17. The device of claim 15, further comprising:
a second watermark encoder operatively coupled to the receiver and the watermark encoder, configured to:
transform the data that is carrying the digital watermark into a second transform domain;
analyze the second transform domain to identify a second plurality of transform coefficients according to a second predetermined criteria;
alter the second plurality of transform coefficients to cause the data to carry a second digital watermark wherein the second digital watermark comprises the metric.

18. The device of claim 17, wherein the second digital watermark is a fragile watermark.

19. The device of claim 15, wherein the data that is carrying the digital watermark is analyzed after the data is rendered.

20. The device of claim 15, further comprising:
a second watermark encoder operatively coupled to the receiver and the watermark encoder, configured to:
transform the data without the digital watermark into a second transform domain;
analyze the second transform domain to identify a second plurality of transform coefficients according to a second predetermined criteria;
alter the second plurality of transform coefficients to cause the data to carry a second digital watermark wherein the second digital watermark comprises the metric.

21. The device of claim 15, wherein the digital watermark comprises a payload that indicates at least one of a type of the data, an indication of how the metric was calculated, a location of a second digital watermark, a trace identifier, a link to a network resource, a type of data creation device, an orientation of the data or a multibit payload message.

22. The device of claim 21, wherein the payload is encrypted.

23. The device of claim 15, wherein the digital watermark is determined based on at least one of a perceptual analysis of a media signal, a mask, a human visual consideration, a robustness requirement, or a required signal gain.

24. The device of claim 15, wherein the predetermined criteria comprises at least one of an indication of a content of the data or a perceptual hash of the data.

25. A device comprising:
a receiver configured to
obtain data representing video or audio; and
a watermark encoder operatively coupled to the receiver and configured to
compress the data by transforming the data into a transform domain,
analyze the transform domain to identify a plurality of transform coefficients, and
alter the plurality of transform coefficients to carry a digital watermark, in which the digital watermark is provided so as to allow detection of signal compression.

26. The device of claim 25, wherein the digital watermark comprises a calibration signal.

27. A device comprising:
a receiver configured to
obtain data representing video or audio comprising a digital watermark; and
a watermark decoder operatively coupled to the receiver and configured to
decode the digital watermark;

decode a first metric from the digital watermark;
measure a second metric from the data representing the video or audio; and
generate an indication about the data based on a comparison of the first metric and the second metric wherein the indication indicates at least one of an authentic data source, an unaltered state, a quality measurement of the data, or a type of rendering device.

28. The device of claim 27, wherein the indication comprises a measurement of a tolerance between the first metric and the second metric.

29. A non-transitory computer readable media comprising instructions stored thereon, the instructions comprising:
instructions to obtain data representing video or audio;
instructions to transform the data into a transform domain;
instructions to analyze the transform domain to identify a plurality of transform coefficients according to a predetermined criteria;
instructions to alter the plurality of transform coefficients to cause the data to carry a digital watermark; and
instructions to analyze the data that is carrying the digital watermark to determine a metric.

30. The non-transitory computer readable media of claim 29, wherein the digital watermark comprises a calibration signal.

31. The non-transitory computer readable media of claim 29, further comprising:
instructions to transform the data that is carrying the digital watermark into a second transform domain;
instructions to analyze the second transform domain to identify a second plurality of transform coefficients according to a second predetermined criteria;
instructions to alter the second plurality of transform coefficients to cause the data to carry a second digital watermark wherein the second digital watermark comprises the metric.

32. The non-transitory computer readable media of claim 31, wherein the second digital watermark is a fragile watermark.

33. The non-transitory computer readable media of claim 29, wherein the data that is carrying the digital watermark is analyzed after the data is rendered.

34. The non-transitory computer readable media of claim 29, further comprising:
instructions to transform the data without the digital watermark into a second transform domain;
instructions to analyze the second transform domain to identify a second plurality of transform coefficients according to a second predetermined criteria;
instructions to alter the second plurality of transform coefficients to cause the data to carry a second digital watermark wherein the second digital watermark comprises the metric.

35. The non-transitory computer readable media of claim 29, wherein the digital watermark comprises a payload that indicates at least one of a type of the data, an indication of how the metric was calculated, a location of a second digital watermark, a trace identifier, a link to a network resource, a type of data creation device, an orientation of the data or a multibit payload message.

36. The non-transitory computer readable media of claim 35, wherein the payload is encrypted.

37. The non-transitory computer readable media of claim 29, wherein the digital watermark is determined based on at least one of a perceptual analysis of a media signal, a mask, a human visual consideration, a robustness requirement, or a required signal gain.

38. The non-transitory computer readable media of claim 29, wherein the predetermined criteria comprises at least one of an indication of a content of the data or a perceptual hash of the data.

39. A non-transitory computer readable media comprising instructions stored thereon, the instructions comprising:
instructions to obtain data representing video or audio; and
instructions to compress the data by transforming the data into a transform domain,
instructions to analyze the transform domain to identify a plurality of transform coefficients, and
instructions to alter the plurality of transform coefficients to carry a digital watermark, in which the digital watermark is provided so as to allow detection of signal compression.

40. The non-transitory computer readable media of claim 39, wherein the digital watermark comprises a calibration signal.

41. A non-transitory computer readable media comprising instructions stored thereon, the instructions comprising:
instructions to obtain data representing video or audio comprising a digital watermark; and
instructions to decode the digital watermark;
instructions to decode a first metric from the digital watermark;
instructions to measure a second metric from the data representing the video or audio; and
instructions to generate an indication about the data based on a comparison of the first metric and the second metric wherein the indication indicates at least one of an authentic data source, an unaltered state, a quality measurement of the data, or a type of rendering device.

42. The non-transitory computer readable media of claim 41, wherein the indication comprises a measurement of a tolerance between the first metric and the second metric.

* * * * *

UNITED STATES PATENT AND TRADEMARK OFFICE
CERTIFICATE OF CORRECTION

PATENT NO. : 8,051,295 B2
APPLICATION NO. : 12/582398
DATED : November 1, 2011
INVENTOR(S) : Brunk et al.

It is certified that error appears in the above-identified patent and that said Letters Patent is hereby corrected as shown below:

Page 3, item (56), under "Other Publications", in Column 2, Line 15, delete "Rob ust" and insert -- Robust --.

Page 3, item (56), under "Other Publications", in Column 2, Line 34, delete "Rhods." and insert -- Rhoads. --.

Signed and Sealed this
Twenty-second Day of May, 2012

David J. Kappos
*Director of the United States Patent and Trademark Office*